United States Patent [19]

Graser et al.

[11] Patent Number: 4,517,270
[45] Date of Patent: May 14, 1985

[54] ELECTROPHOTOGRAPHIC RECORDING MEDIUM

[75] Inventors: Fritz Graser, Ludwigshafen; Gerhard Hoffmann, Otterstadt; Reinhold J. Leyrer, Ludwigshafen; Peter Neumann, Wiesloch; Manfred Patsch, Wachenheim, all of Fed. Rep. of Germany

[73] Assignee: BASF Aktiengesellschaft, Fed. Rep. of Germany

[21] Appl. No.: 358,527

[22] Filed: Mar. 16, 1982

[30] Foreign Application Priority Data

Mar. 20, 1981 [DE] Fed. Rep. of Germany ....... 3110954

[51] Int. Cl.$^3$ .............................................. G03G 5/06
[52] U.S. Cl. ......................................... 430/58; 430/71
[58] Field of Search .................................... 430/58, 71

[56] References Cited

U.S. PATENT DOCUMENTS 3,871,882 3/1975 Wiedemann ................... 430/58 X

FOREIGN PATENT DOCUMENTS 2220408 4/1972 Fed. Rep. of Germany .
2237539 7/1972 Fed. Rep. of Germany .
2636421 5/1979 Fed. Rep. of Germany .
2841948 4/1980 Fed. Rep. of Germany .
2842022 4/1980 Fed. Rep. of Germany .
2841925 4/1980 Fed. Rep. of Germany .

Primary Examiner—John D. Welsh
Attorney, Agent, or Firm—Keil & Weinkauf

[57] ABSTRACT

An electrophotographic recording medium which consists essentially of an electrically conductive base and a photosemiconductive double layer which comprises a first layer containing charge carrier-producing dyes, and a second layer containing one or more compounds which are charge carrier-transporting when exposed to light, wherein the charge carrier-producing dyes are dark in color, possess substantially panchromatic absorption characteristics, and are of the general formula

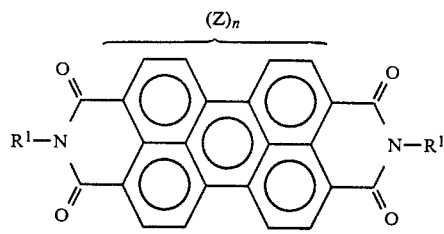

where $R^1$ is propyl, 1-hydroxypropyl, 1-methoxypropyl or 1-phenylethyl, Z is p-phenylazoanilino, phenylthio or anilino, and n is 0–6, and a process for the production of this electrophotographic recording medium.

3 Claims, 1 Drawing Figure

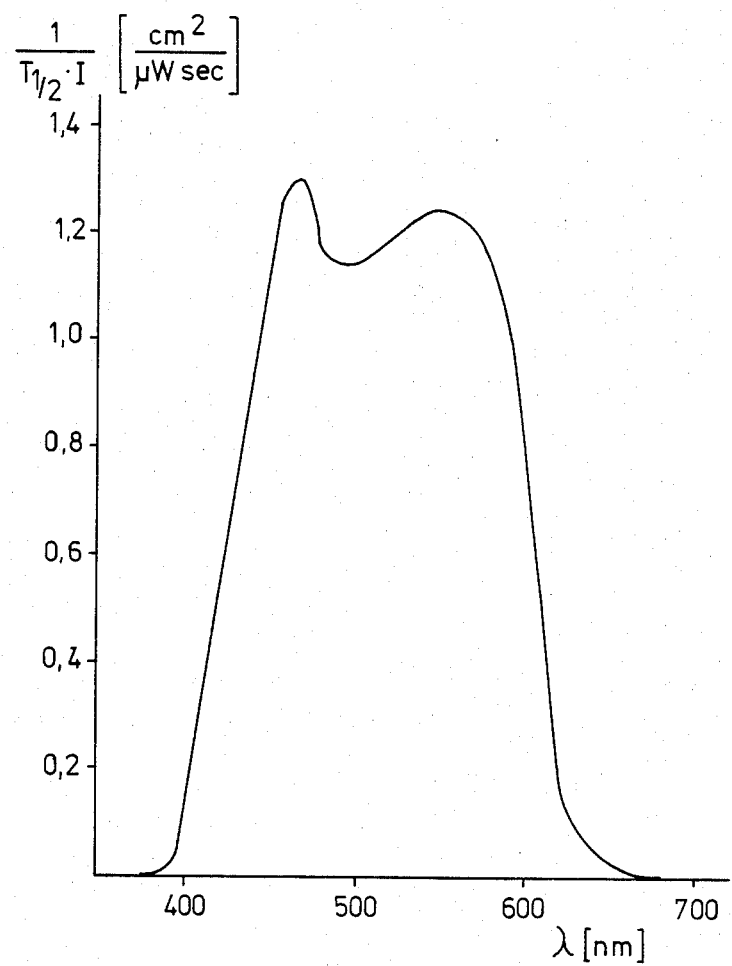

ELECTROPHOTOGRAPHIC RECORDING MEDIUM

The present invention relates to an electrophotographic recording medium which consists of an electrically conductive base and a photosemiconductive double layer composed of organic materials, and to a process for the production of this electrophotographic recording medium.

Electrophotographic recording media comprise either one homogeneous layer of a photosemiconductor, or a plurality of layers one on top of another, on an electrically conductive base. Recording media with this multilayer composite structure comprise a conductive base, a first layer containing charge carrier-producing compounds, and, on top of this layer, a second layer containing charge carrier-transporting substances. Composite structures of this type have been described, inter alia, in German Laid-Open Application DOS No. 2,220,408. German Laid-Open Application DOS No. 2,237,539 discloses similar electrophotographic elements which contain dyes of the general formula I

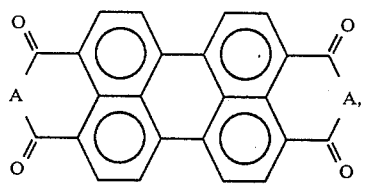
(I)

where A is oxygen or N—R, where R is hydrogen, alkyl or alkylphenyl, as charge carrier-producing compounds in the first layer.

These compounds are preferably applied to the conductive base by vapor deposition under greatly reduced pressure at above 300° C.

In the drawing the FIGURE sets forth an appropriate photosensitivity spectrum for the red pigments. From this spectrum, it can be seen that the photosensitivity of the red perylene tetracarboxylic acid derivatives which have been vapor deposited under greatly reduced pressure is only assured in the range from about 450 to 600 nm. In electrophotography, however, it is desirable to have a panchromatic layer, i.e. one which has virtually uniform sensitivity over the whole visible range of the spectrum, so that copies having good grey gradation may be produced from colored originals.

Black dyes based on perylene tetracarboxylic acid and possessing photoconductivity have also been described (German Laid-Open Application DOS No. 2,636,421), and these dyes, together with others described in German Laid-Open Application DOS No. 2,804,669, have been disclosed as being suitable for use in a photoelectrophoretic process. Other perylene tetracarboxylic acid derivates have been described in German Laid-Open Applications DOS No. 2,841,925, DOS No. 2,841,948 and DOS No. 2,842,022.

It is an object of the present invention to provide an electrophotographic recording medium which has a composite structure, possesses panchromatic absorption characteristics, i.e. is able to produce good copies of colored originals and utilizes all the light from printing lamps, may be produced in a simple manner, and in addition possesses improved electrophotographic properties.

We have found that this object is achieved with an electrophotographic recording medium which comprises (a) an electrically conductive base, (b) a first layer, from 0.01 to 5 μm thick, which contains charge carrier-producing dyes of a particular type, and (c) a second layer which is substantially transparent to actinic light and is composed of insulating organic materials containing one or more compounds which are charge carrier-transporting when exposed to light.

We have found that certain perylene derivatives, which are black pigments owing to their crystal properties, or which are dark dyes as a result of specific substitution in the perylene skeleton, give good electrophotographic recording media with panchromatic absorption characteristics, after application from a dispersion by means of a knife-coater.

The electrophotographic recording media according to the invention contain perylene tetracarboxylic acid derivatives of the general formula II

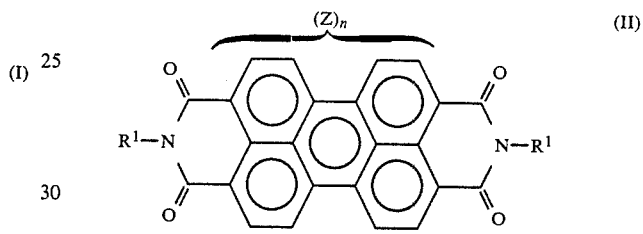
(II)

where, when n is 1–6, Z is p-phenylazoanilino, phenylthio or anilino and $R^1$ is hydrogen, and when n is 0, $R^1$ is propyl, 1-hydroxypropyl, 1-methoxypropyl or 1-phenylethyl.

The corresponding dyes are prepared in a conventional manner, in the first case by reacting appropriately chlorinated perylene-3,4,9,10-tetracarboxylic acid diimide, in dimethylformamide, with aniline, thiophenol or aminoazobenzene, and in the second case by condensation of perylene-3,4,9,10-tetracarboxylic acid, or its anhydride, with the appropriate aniline in a solvent or diluent, e.g. quinoline, naphthalene or trichlorobenzene, or in a large excess of the amine, at 180°–230° C. The reaction is advantageously carried out in the presence of agents which accelerate the condensation, e.g. zinc chloride, zinc acetate, zinc propionate or hydrochloric acid.

To prepare the novel electrophotographic recording medium, the dyes which are suitable according to the invention, dissolved in an organic, readily volatile solvent, either alone or together with a binder which is conventionally used for this purpose and which may or may not possess the characteristics of a barrier layer, are applied to the conductive base to form the first charge carrier-producing layer, which is from 0.01 to 5 μm, preferably from 0.05 to 1.4 μm, thick when dry. The ratio of dye to binder is from 1:0 to 1:3, preferably from 1:0.2 to 1:0.8 An adhesive layer about 0.05–5 μm, preferably 0.1–0.8 μm, thick may be located between the base and the first layer.

The transparent second layer, 1–40 μm, preferably 5–25 μm, thick, is located on top of the first layer, and is also cast from a solution. It is composed of from 30 to 60 percent by weight of one or more charge carrier-transporting compounds, from 65 to 35 percent by weight of one or more binders conventionally used for this purpose, and from 0.1 to 4 percent by weight of additives which improve the mechanical properties, with or without up to 5 percent by weight of sensitizers or activators. The layer is cast from a low-boiling solvent.

A barrier layer about 0.05 to 1.5 μm, preferably 0.1 to 0.5 μm, thick may be located between the first and second layers, and, depending on the intended use of the electrophotographic recording medium, it may be appropriate to apply an inactive, protective top layer to the charge carrier-transporting layer.

Suitable electrically conductive bases are aluminum foils, aluminum sheet or nickel sheet, or plastic films, preferably polyester films, coated by vapor deposition with aluminum, tin, lead, bismuth or a similar metal. The choice is influenced by the field of use of the electrophotographic element.

The barrier layer between the conductive base and the first layer, or between the latter and the second layer, usually consists of a metal oxide, e.g. aluminum oxide, or a polymer, e.g. a polyamide, polyvinyl alcohol, a polyacrylate or polystyrene, or a similar system. However, the binder of the first layer may also be used as the barrier layer material, if desired.

Polyacrylates, polymethacrylates, polyesters, polyphthalates, polyvinyl chlorides, styrene/maleic acid copolymers, epoxides and other conventional resins are suitable binders for accommodating the dyes according to the invention in the production of the charge carrier-producing layer which forms part of the novel electrophotographic recording medium.

Suitable binders for the second, charge carrier-transporting layer are in particular polyvinyl chloride, polyester resins, polyacetal resins, polycarbonates, polystyrene and polyurethanes, i.e. those binders which are known by the skilled worker to possess special electrical properties. Thus, silicone resins, polyvinyl acetate, chlorinated rubber, cellulose esters, ethylcellulose and the like may also be used. Suitable charge carrier-transporting compounds present in this layer are those which do not adversely affect the transparency to visible light, for example (a) low molecular weight compounds, in particular heterocyclic compounds, e.g. pyrazoline derivatives, oxazoles, oxadiazoles, phenylhydrazones, imidazoles, triphenylamine derivatives, carbazole derivatives and pyrene derivatives, and other, condensed aromatic compounds, and (b) polymeric materials, for example polyvinylpyrenes, poly-(N-vinylcarbazole) and copolymers of carbazole and styrene and/or vinyl acetate and/or vinyl chloride.

Of the polymers, poly-(N-vinylcarbazole) is particularly suitable.

The novel electrophotographic recording media may also contain further constituents to improve their mechanical properties. Thus, wetting agents, for example silicone oils, can improve the surface quality. Moreover, sensitizers or activators may additionally be incorporated into the upper, second layer. Examples of conventional sensitizers, which may be dispersed, are triphenylmethane dyes, xanthone dyes and soluble perylene derivatives, e.g. perylenetetracarboxylic acid esters. Compounds having a high electron affinity, for example nitro compounds, such as 2,4,7-trinitrofluoren-9-one, may be used as activators.

The novel electrophotographic recording medium contains very photosensitive photosemiconductive double layers which possess high mechanical stability and can run continuously, for example attached to the surface of a cylindrical drum or as an endless belt, without exhibiting signs of wear. Accordingly, they are very useful for reproduction work, for example as copying layers or electrophotographic offset printing plates.

The Examples which follow illustrate the invention.

EXAMPLES 1 TO 4

5 g of each of the compounds 1 to 4

COMPOUND 1

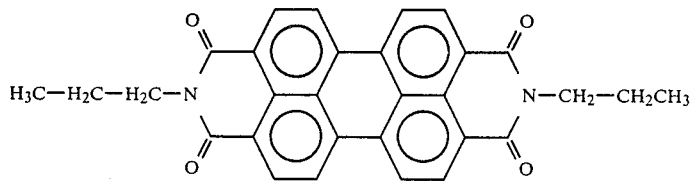

COMPOUND 2

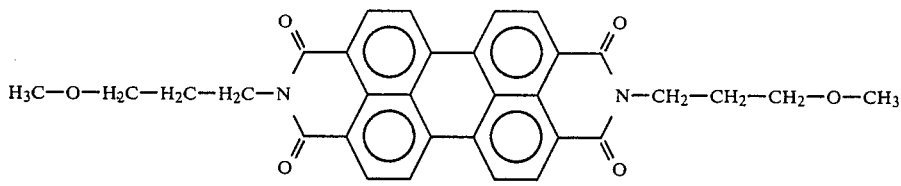

COMPOUND 3

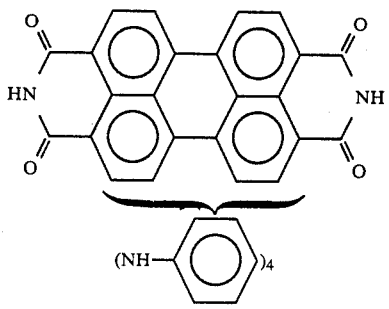

COMPOUND 4

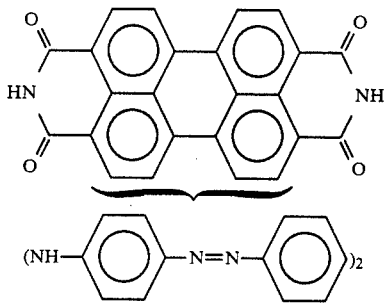

were mixed with 3 g of a copolymer of vinyl chloride, acrylic acid and a maleic acid diester, and 25 g of tetrahydrofuran, and the mixture was tumbled on a roller-stand for 12 hours. This milling time must be adhered to, since the pigments may change from black to red when too finely milled. Thereafter 75 g of tetrahydrofuran and 25 g of toluene were added, and the mixture was homogenized on the roller-stand for one hour.

This dispersion was then applied with a knife-coater to a base of 175 μm thick untreated aluminum sheet. A 60 μm casting slot was used, and the speed of the knife-coater was 260 mm/minute. After the solvent had been allowed to evaporate off in the air and drying had been affected for 30 minutes at 90° C., a 0.75-0.8 μm thick dry layer resulted.

A solution of 47.75 g of poly-(N-vinylcarbazole), 5.2 g of dihexyl phthalate and 5.75 g of a polycarbonate of melting point 220°-230° C. in a mixture of 287.5 g of tetrahydrofuran and 74.25 g of toluene was applied to the first, high-hiding layer in each case. A casting slot of 140 μm was used, and the speed of the knife-coater was 260 mm/minute. After the solvent had been allowed to evaporate off in the air and drying had been effected for 30 minutes at 90° C., an 8-8.5 μm thick dry layer was obtained.

The electrophotographic element prepared in this manner was subjected to −7.40 kV with a corona wire at a distance of 10 mm above the surface of the layer. After a loading period of 20 seconds, the maximum surface potential achieved was determined in volts. This surface potential was compared with the surface potential of a plate produced in an identical manner and, according to German Laid-Open Application DOS No. 2,237,539, containing N,N'-dimethylperylene-3,4,9,10-tetracarboxylic acid diimide, the surface potential of this plate being taken as 100%. After a further 20 seconds in the dark, the decrease in potential as a percentage of the maximum potential was determined. The electrophotographic element was then exposed to light from a 150 watt xenon lamp, and the light-induced decrease in potential, as a percentage of the potential after it had decreased in the dark, was determined. The same procedure was then carried out with the light from the xenon lamp being passed through a filter (OG 590 from Spinder and Hoyer, Göttingen, Germany).

The results of the measurements are given in the Table.

COMPARATIVE EXPERIMENT

The procedure described in the Examples according to the invention was followed, except that perylene-3,4,9,10-tetracarboxylic acid N,N'-dimethyldiimide,

COMPOUND 5

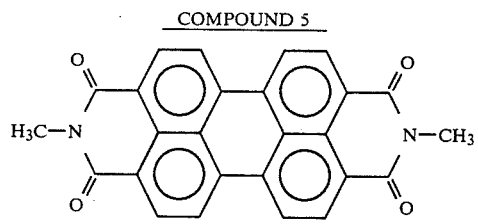

was employed as the dye. The results of the measurements are given in the Table.

TABLE

| Compound | Relative surface potential in % | Decrease in the dark in % | Decrease on exposure to light in % | |
|---|---|---|---|---|
| | | | (unfiltered) | (filtered) |
| 1 | 111 | 21 | 70 | 28 |
| 2 | 100 | 19 | 83 | 42 |
| 3 | 91 | 35 | 74 | 32 |
| 4 | 76 | 31 | 74 | 26 |
| 5 | 100 | 20 | 77 | 8 |

We claim:

1. An electrophotographic recording medium which consists essentially of an electrically conductive base, a first layer containing charge carrier-producing dyes, and a second layer which is substantially transparent to actinic light and is composed to an insulating organic material containing at least one compound which is charge carrier-transporting when exposed to light, wherein the charge carrier-producing dye contained in the first layer is dark in color, possesses substantially panchromatic adsorption characteristics, and is of the formula II

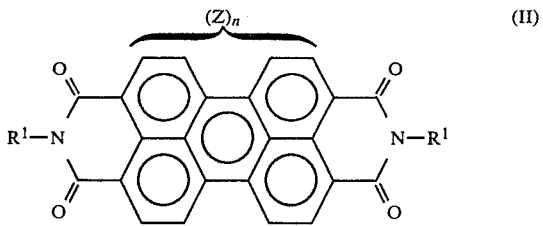

where n is 1–6, Z is p-phenylazoanilino, phenylthio or anilino, and $R^1$ is hydrogen.

2. An electrophotographic recording medium as claimed in claim 1, wherein in the second layer, which is substantially transparent to actinic light, the compound which is charge carrier-transporting when exposed to light is poly-(N-vinylcarbazole).

3. A process for the production of an electrophotographic recording medium as claimed in claim 1, wherein a first dispersion containing charge carrier-producing dyes is first applied to an electrically conductive base to give a 0.005–5 μm thick dry layer, a conventional barrier layer is then applied, if desired, and thereafter a solution of an insulating organic material, together with a compound which is charge carrier-transporting when exposed to light, is applied to form a second layer which is 2–40 μm thick when dry.

* * * * *